US010226725B2

(12) United States Patent
Ishida et al.

(10) Patent No.: US 10,226,725 B2
(45) Date of Patent: Mar. 12, 2019

(54) OIL MIST SEPARATION METHOD AND OIL SEPARATOR

(71) Applicant: TOKYO ROKI CO., LTD., Yokohama-shi, Kanagawa (JP)

(72) Inventors: Kosaku Ishida, Yokohama (JP); Tsuyoshi Yao, Yokohama (JP); Yoshitaka Watanabe, Yokohama (JP)

(73) Assignee: TOKYO ROKI CO., LTD., Yokohama-shi, Kanagawa (JP)

( * ) Notice: Subject to any disclaimer, the term of this patent is extended or adjusted under 35 U.S.C. 154(b) by 151 days.

(21) Appl. No.: 15/508,419

(22) PCT Filed: Sep. 5, 2014

(86) PCT No.: PCT/JP2014/073515
§ 371 (c)(1),
(2) Date: Mar. 2, 2017

(87) PCT Pub. No.: WO2016/035203
PCT Pub. Date: Mar. 10, 2016

(65) Prior Publication Data
US 2017/0296955 A1    Oct. 19, 2017

(51) Int. Cl.
*B01D 45/14*    (2006.01)
*B04B 5/00*    (2006.01)
(Continued)

(52) U.S. Cl.
CPC .............. *B01D 45/14* (2013.01); *B01D 47/00* (2013.01); *B01D 47/02* (2013.01); *B01F 3/04* (2013.01);
(Continued)

(58) Field of Classification Search
CPC ........... B01D 45/12; B01D 45/14; B01F 3/04; B04B 7/14; B04B 5/005; B04B 5/12
(Continued)

(56) References Cited

U.S. PATENT DOCUMENTS 6,925,993 B1    8/2005 Eliasson et al.
9,840,951 B2 *  12/2017 Andersson Aginger .....................
                                                            B01D 45/14
2010/0180854 A1  7/2010 Baumann et al.

FOREIGN PATENT DOCUMENTS

CN        1287900 C    12/2006
DE    102010002784 A1   9/2011
(Continued)

OTHER PUBLICATIONS

International Search Report for PCT/JP2014/073515, ISA/JP, dated Oct. 7, 2014, with English translation.
(Continued)

*Primary Examiner* — Robert A Hopkins
(74) *Attorney, Agent, or Firm* — Harness, Dickey & Pierce, P.L.C.

(57) ABSTRACT

A rotor separates oil mist from a target gas. This rotor includes a separation disk group having separation disks including a plurality of truncated cone shape plate members layered. The separation disk group includes a first space (hollow part with attachment opening) and a second space (gaps between separation disks), the first space formed on a rotation center side of the rotor and the second space formed between separation disks that are laid over and in communication with the first space. The first space contains an oil introducing portion (gap between the upper end of the spindle and the upper side sealing member). Target gas is introduced into the first space, target gas and oil introduced from the oil introducing portion are made to flow from the first space to the second space to be discharged outward from an outer peripheral edge of the separation disk group, while rotating the rotor.

6 Claims, 11 Drawing Sheets

(51) Int. Cl.
  *B01F 3/04*   (2006.01)
  *B04B 5/12*   (2006.01)
  *B01D 47/00*  (2006.01)
  *B04B 1/08*   (2006.01)
  *B04B 7/14*   (2006.01)
  *B01D 47/02*  (2006.01)

(52) U.S. Cl.
  CPC ............... *B04B 1/08* (2013.01); *B04B 5/005* (2013.01); *B04B 5/12* (2013.01); *B04B 7/14* (2013.01)

(58) Field of Classification Search
  USPC ..................................... 55/400, 404; 261/30
  See application file for complete search history.

(56) References Cited

FOREIGN PATENT DOCUMENTS

| EP | 1549438 | A1 | 7/2005 |
| JP | H09-117625 | A | 5/1997 |
| JP | 2003-513792 | A | 4/2003 |
| JP | 2005-507310 | A | 3/2005 |
| JP | 2005-515065 | A | 5/2005 |
| WO | WO-2004/022239 | A1 | 3/2004 |
| WO | WO-2013-045453 | A1 | 4/2013 |

OTHER PUBLICATIONS

Form PCT/IB/338 with the English Translation of the International Preliminary Report on Patentability, IB/Geneva, dated Mar. 7, 2017, incorporating the English Translation of the Written Opinion of the ISA, ISA/JP, dated Oct. 7, 2014.

Extended European Search Report for parallel application EP 14901398.9, EPO, Munich, dated Mar. 14, 2018.

Japanese Office Action for JP2016-546274 with English Translation, dated Nov. 20, 2017.

Chinese Office Action in CN201480081733.0, SIPO, dated Sep. 21, 2018, with English translation attached.

* cited by examiner

OIL MIST SEPARATION METHOD AND OIL SEPARATOR

CROSS REFERENCE TO RELATED APPLICATIONS

This application is a 371 U.S. National Stage of International Application No. PCT/JP2014/073515, filed Sep. 5, 2014. The disclosures of the above application are incorporated herein by reference.

TECHNICAL FIELD

The present invention relates to a separation method for separating oil mist contained in target gas from the gas and to an oil separator.

BACKGROUND ART

There has been known an oil separator that separates oil mist contained in target gas from the gas. For example, an oil separator described in Patent Literature 1 uses a rotor provided between a gas inlet port and a gas discharge port to separate oil mist from the gas using centrifugal force. This rotor is structured with a plurality of separation disks placed one over the other. These separation disks are configured with truncated cone shape plate members that have the outer peripheral side parts curved obliquely upward such that the radius on the upper side becomes large. The inner circumferential side parts of the separation disks have formed thereto openings that penetrate the separation disks in the thickness direction. In this way, a space is formed to the inner circumferential side part of this rotor.

This oil separator introduces crankcase gas (blow-by gas) being the target gas into the space on the inner circumferential side of the rotor. The crankcase gas introduced into this space flows to the outer peripheral side of the rotor through the gaps created between the separation disks rotating at high speed and condenses the oil mist within these gaps to separate the oil mist from the crankcase gas.

CITATION LIST

Patent Literature

Patent Literature 1 Japanese translation of PCT International Application No. 2003-513792

DISCLOSURE OF THE INVENTION

Problems to be Solved by the Invention

In the above-described oil separator, the oil mist contained in the crankcase gas is taken into the boundary layers that are formed to the surfaces of the separation disks accompanied, by the high-speed rotation of the separation disks. Then the oil mist taken into the boundary layers merges and condenses on the surface of the separation disks with the other oil mist similarly taken in. The diameter of the of the separation disks need to be widened to take in much oil mist in order to increase the oil mist separation efficiency since there is an extremely small amount of oil mist contained in the crankcase gas. Thus there arises an issue that the size of the oil separator would grow along with the increase in the diameter of the separation disks.

The present invention has been made under these circumstances, and an object of the present invention is to increase the separation efficiency during separation of oil mist contained in target gas from the gas.

SUMMARY OF INVENTION

To achieve the above-described object, the present invention is an oil mist separation method that separates oil mist from target gas by using an oil separator including a rotor that is rotatable together with a spindle and by rotating the rotor, the method characterized to include in the rotor a separation disk group, the separation disk group having separation disks made with a plurality of truncated cone shape plate members layered in an axis direction of the spindle, include in the separation disk group a first space and a second space, the first space being formed on a rotation center side of the rotor and the second space being formed between the separation disks that are laid over and being in communication with the first space, dispose in the first space an oil introducing portion that introduces oil, introduce the oil from the oil introducing portion together with the target gas into the first space, while the rotor is in a rotating state, and allow the target gas to flow from the first space into the second space together with the oil introduced from the oil introducing portion and to be discharged outward from an outer peripheral edge of the separation disk group.

According to the oil mist separation method of the present invention, both the target gas introduced into the first space and the oil introduced into the first space are made to flow into the second space formed between the separation disks. Here, the oil is recognized to spread in a film-like manner on the surface of the separation disks since the rotor is rotated at high-speed. And the oil mist contained in the target gas is taken into the boundary layer formed to the surface of the oil film. The oil film has a higher compatibility compared to the separation disk since the oil of the oil film is the same as that of the oil mist. Therefore, the boundary layer formed to the surface of the oil film can take in the oil mist in a more efficient manner compared to the boundary layers formed to the surface of the separation disks.

In the above-described oil mist separation method, it is preferable that the oil separator includes a nozzle that is provided to protrude from a circumferential face of the spindle on a lower side with respect to the separation disks and that rotates the spindle by injecting oil, and a spindle shaft that rotatably supports the spindle and that has internally formed an oil supply passage to supply the oil, the oil introducing portion is configured with a gap between the spindle and the spindle shaft, and a part of the oil supplied to the oil supply passage is injected from the nozzles and another part of the oil is introduced from the oil introducing portion into the first space. According to this separation method, the oil supplied to the oil supply passage can be used as the power for rotating the spindle as well as used for forming oil films.

In the above-described oil mist separation method, it is preferable that the target gas is blow-by gas that is supplied from the engine and oil supplied to the oil supply passage is a lubricant of the engine. In this separation method, the oil mist originates from engine lubricant and since the oil film is the engine lubricant, oil mist can be further efficiently taken in by the increased compatibility characteristics.

In the above-described oil mist separation method it is preferable that, the oil separator includes a third space in which oil injected from the nozzles flows down and in which the target gas is introduced, and a partitioning member that is disposed at a boundary between the third space and the first space, the target gas is made to contact the oil injected from the nozzles and the oil mist is primarily separated from the target gas, in the third space, the target gas that had the oil mist primarily separated is introduced into the first space by the partitioning member, the target gas is made to flow from the first space into the second space together with the oil introduced from the oil introducing portion, and the target gas is made to contact the oil introduced from the oil introducing portion and the oil mist is secondarily separated from the target gas, in the second space. With this separation method, the oil mist contained in target gas is primarily separated using the oil injected from the nozzles and then secondarily separated using the oil introduced from the oil introducing portion so that the oil mist can be separated at a further increased level.

Further, the present invention is an oil separator including a rotor that is rotatable together with a spindle and being configured to separate oil mist from target gas by rotating the rotor, the oil separator characterized to include a separation disk group that is included in the rotor and that has separation disks made with a plurality of truncated cone shape plate members layered in an axis direction of the spindle, a first space and a second space that are included in the separation disk group, the first space being formed on a rotation center side of the rotor and having the target gas flow in, and the second space being formed between the separation disks that are laid over and being in communication with the first space, and an oil introducing portion that is disposed in the first space, the oil introducing portion being configured to introduce oil.

ADVANTAGEOUS EFFECTS OF INVENTION

According to the present invention, the separation efficiency during separation of oil mist contained in target gas from the gas can be increased.

BRIEF DESCRIPTION OF DRAWINGS

FIG. 11 is a diagram schematically illustrating how the oil mist is taken in.

DETAILED DESCRIPTION

The following describes embodiments of the present invention with reference to the drawings. The following gives a description with an example of a closed crankcase ventilation system 1 (hereinafter referred to as a ventilation system 1).

Figure 1:
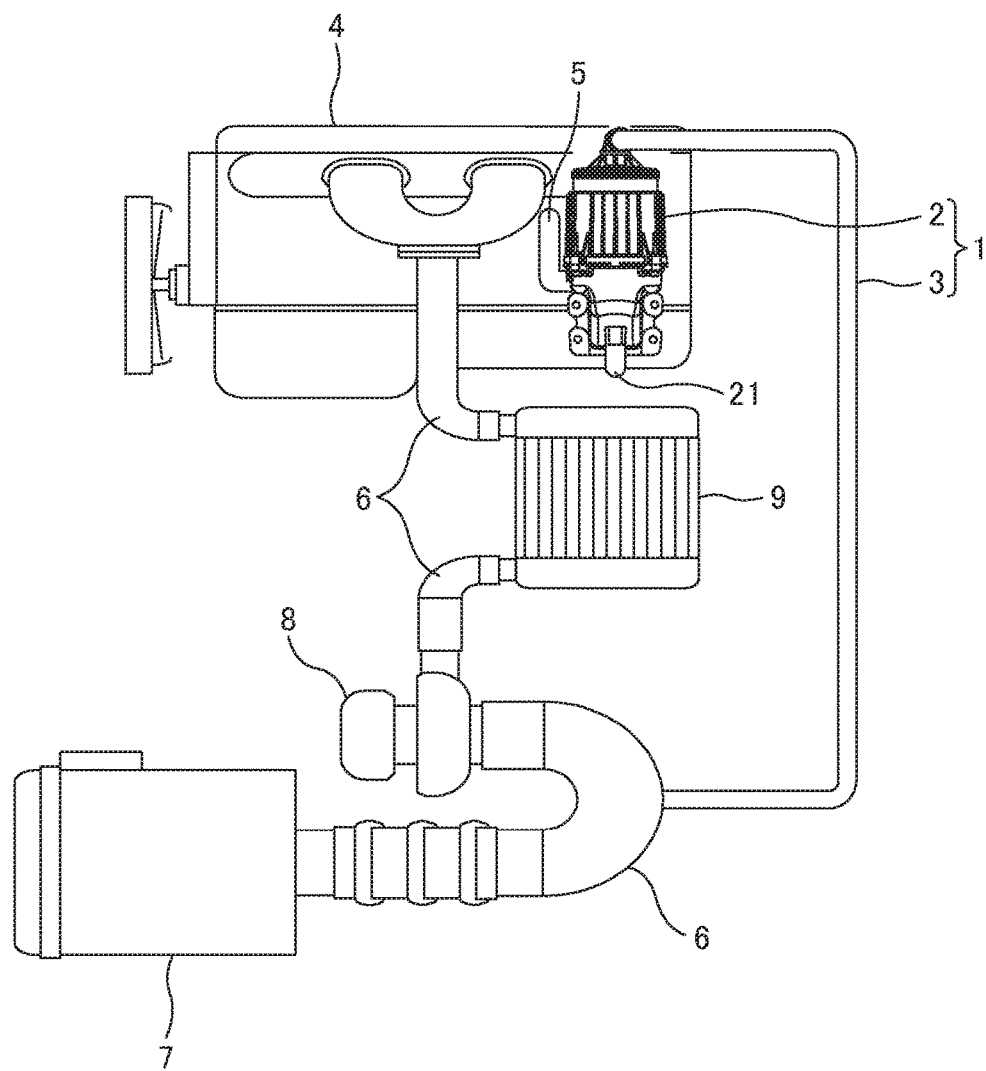
FIG. 1 is a schematic diagram illustrating a closed crankcase ventilation system.

As illustrated in FIG. 1, the ventilation system 1 includes an oil separator 2 and a breather pipe 3. The oil separator 2 processes blow-by gas (corresponding crankcase gas, that is, target gas containing oil mist) discharged from an engine 4 to separate the oil mist. This embodiment includes the oil separator 2 mounted at a side surface of the engine 4. The breather pipe 3 defines a return flow passage, through which the processed blow-by gas discharged from the oil separator 2 returns to an intake-side flow passage of the engine 4.

In this ventilation system 1, the blow-by gas is guided out from the engine 4 through a gas guide pipe 5 and introduced into the oil separator 2. Then the oil mist contained in the blow-by gas is taken into the oil supplied from the engine 4 at the interior of the oil separator 2 and returned to the engine 4 together with this oil. Meanwhile, the processed blow-by gas having oil mist removed is discharged from the oil separator 2 and then returned to the intake-side flow passage 6 through the breather pipe 3. Specifically, the processed blow-by gas is returned to a part at which an air filter 7 is coupled to a turbocharger 8 in the intake-side flow passage 6. The returned blow-by gas is mixed with fresh air sent from the air filter 7 and is compressed by the turbocharger 8. Afterwards, the blow-by gas is cooled by a charge cooler 9 and is supplied to the engine 4.

Figure 2:
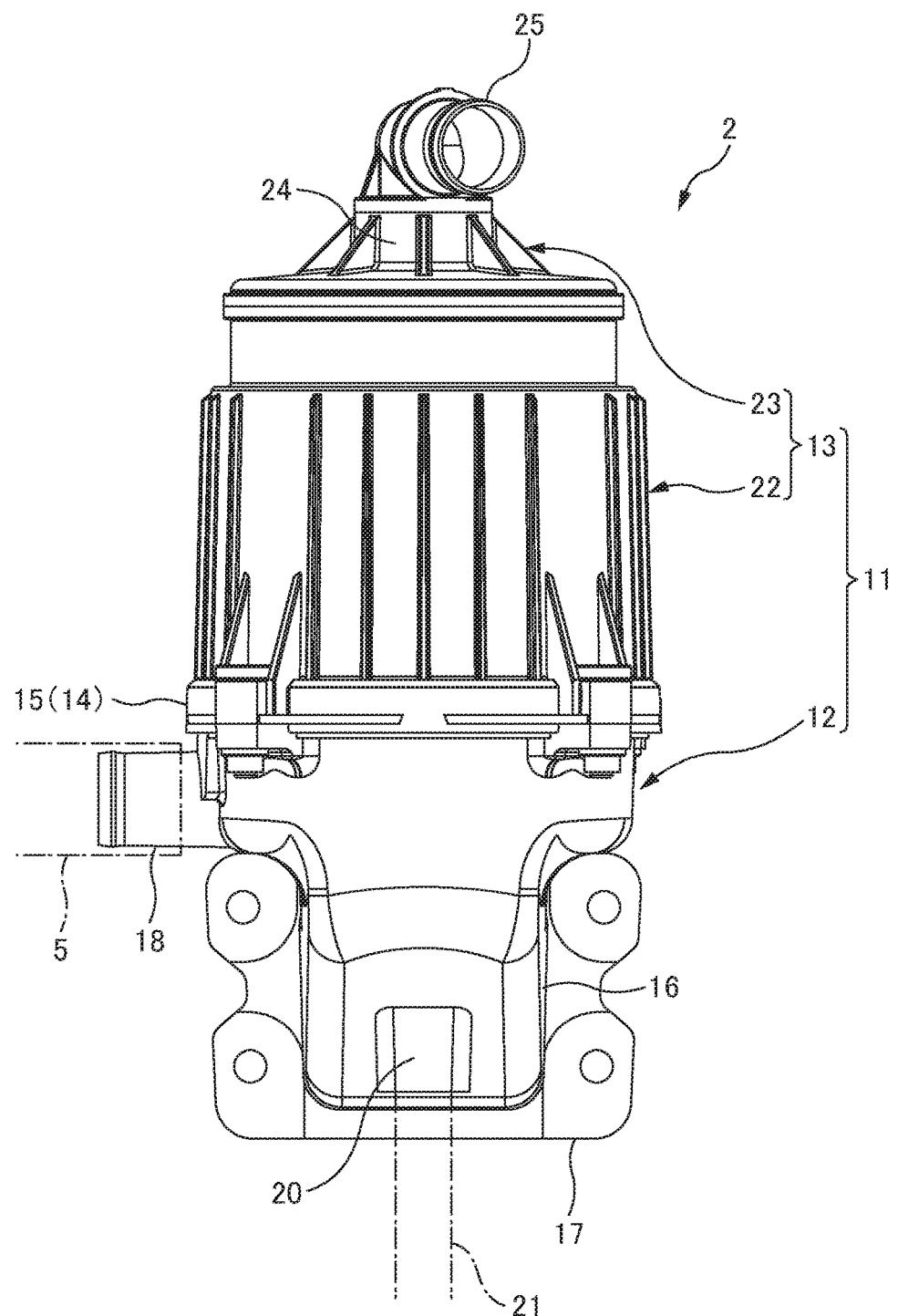
FIG. 2 is a front view of an oil separator.
Figure 3:
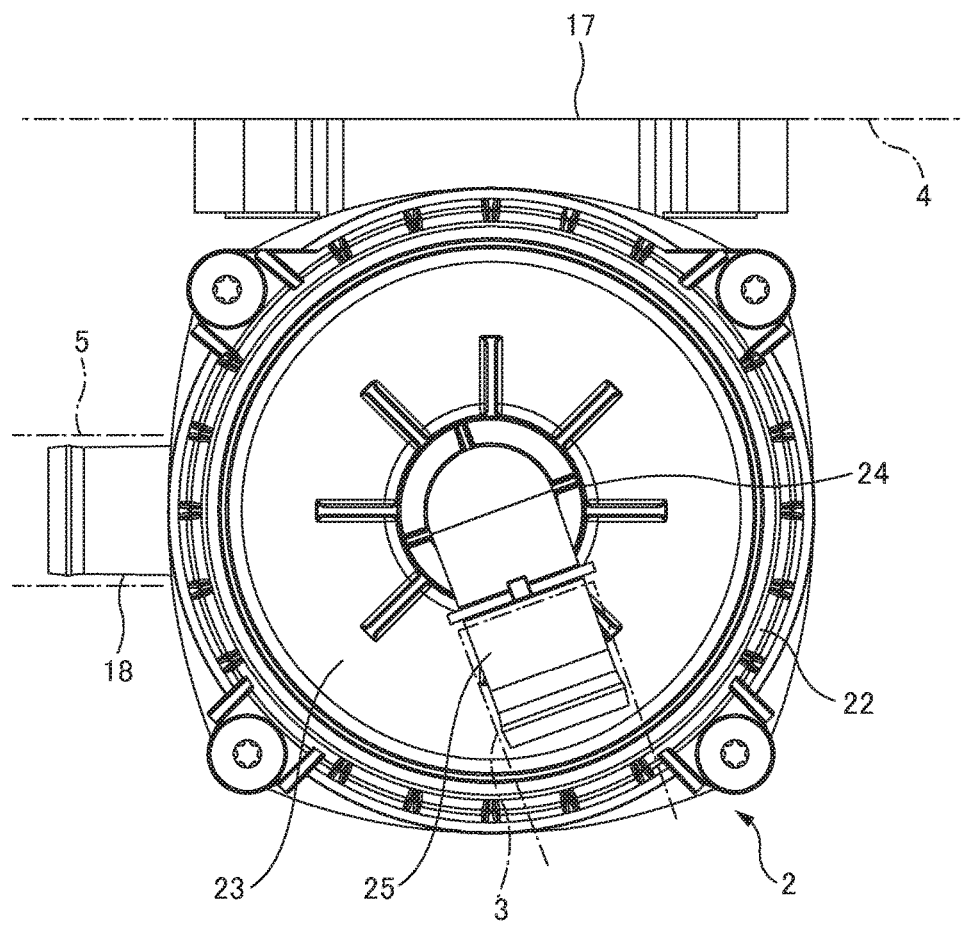
FIG. 3 is a plan view of the oil separator.

The following describes the oil separator 2. As illustrated in FIGS. 2 and 3, this oil separator 2 includes a housing 11, which includes a lower case 12 and an upper case 13. The housing 11 houses such as a rotor unit, a sectioning member, and a PCV valve (all to be described later in detail) in an internal space thereof.

Figure 4:
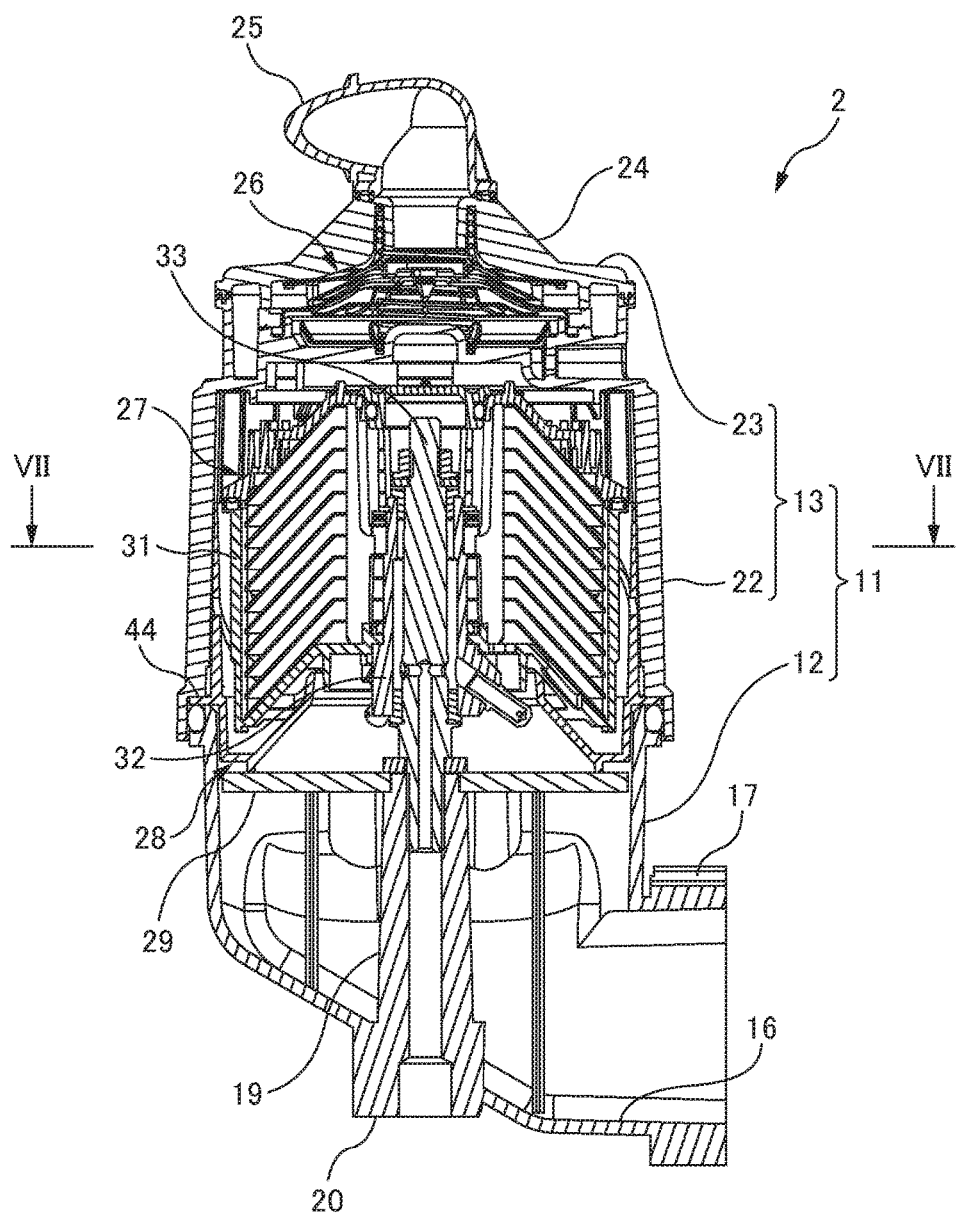
FIG. 4 is a vertical section view of the entire oil separator viewed from the right side.

As illustrated in FIG. 2, the lower case 12 is a part that sections a lower side part in the housing 11. The lower case 12 is constituted of a box-shaped member having a bottom and an opened top surface. An upper end portion of the lower case 12 has a circular fitting portion 14 disposed thereon and a lower end portion 15 of the upper case 13 fits thereto. Hereby, the lower case 12 and the upper case 13 are hermetically coupled. As illustrated in FIG. 4, the lower case 12 includes on the back surface thereof a communication tube portion 16 facing backward. This communication tube portion 16 is a tubular member that serves as the discharge port of the oil used in the oil separator 2. Hereby, the internal space of the communication tube portion 16 is communicated to the internal space of the engine 4. As illustrated in FIGS. 2 and 3, the communication tube portion 16 includes a flange 17 at its distal end portion where this flange 17 joined to the side surface of the engine 4. Further, a suction pipe 18 is provided to the upper portion on the left of the lower case 12 in a manner protruding toward to the left side.

The gas guide pipe 5 is coupled to this suction pipe 18. The blow-by gas from the engine 4 is introduced from the gas guide pipe 5 through the suction pipe 18 and into the interior of the oil separator 2 by the suction pressure of the engine 4 and the pressure on the crankcase side. During such, the suction pressure of the engine 4 and the pressure on the crankcase side is appropriately adjusted. And the suction pipe 18 functions as a gas introducing portion.

As illustrated in FIGS. 2 and 4, a joint 20 of the oil guide pipe 19 is provided on the bottom surface of the lower case 12. This joint 20 is coupled to one end of an oil supply pipe 21, which is illustrated in FIG. 1. The oil supply pipe 21 is provided for supplying the oil sent out from the engine 4 to the oil guide pipe 19. The oil that has been supplied to the oil guide pipe 19 is injected from the nozzles of the rotor unit, which will be described later in detail, and then used as the power to rotate the rotor unit. In the following description, the oil injected from the nozzles is also called power oil for the sake of convenience. This power oil is a part of the lubricant used at the engine 4 and thus maintained at a temperature between 80 and 110° C.

As illustrated in FIG. 2, the upper case 13 is a member mounted to the lower case 12 from above. This upper case 13 includes a cylindrical body cover 22 including a roof part and a disk-shaped top surface cover 23. The body cover 22 is mounted in an airtight manner to the lower case 12. The top surface cover 23 is mounted in an airtight manner to the upper end portion of the body cover 22. Further, as also illustrated in FIG. 3, a cylindrical gas discharge portion 24 is provided to protrude upward at a center of the top surface cover 23. This gas discharge portion 24 is a part from which the processed blow-by gas is discharged. The aforementioned breather pipe 3 is coupled to this gas discharge portion 24 via an L-shaped outlet pipe 25.

The following describes an internal structure of the oil separator 2 with reference to FIG. 4. Here in FIG. 4, the left side corresponds to the front side of the oil separator 2 and the right side corresponds to the back side of the oil separator 2. As shown in FIG. 4, a PCV valve 26, a rotor unit 27 and a partitioning member 28 are disposed in the housing 11. The PCV valve 26 is disposed to the top part of the 11. Specifically, the PCV valve 26 is mounted between the main body cover 22 and the top face cover 23 while being covered by the top face cover 23. The rotor unit 27 is disposed at a vertically middle portion of the housing 11. Specifically, the rotor unit 27 is rotatably disposed in the internal space partitioned by the main body cover 22. The partitioning member 28 is disposed directly below the rotor 31 that constitutes the rotor unit 27. This partitioning member 28 is positioned with the brim portion 44 sandwiched between the lower end portion 15 of the upper case 13 and the fitting portion 14 of the lower case 12.

Figure 5:
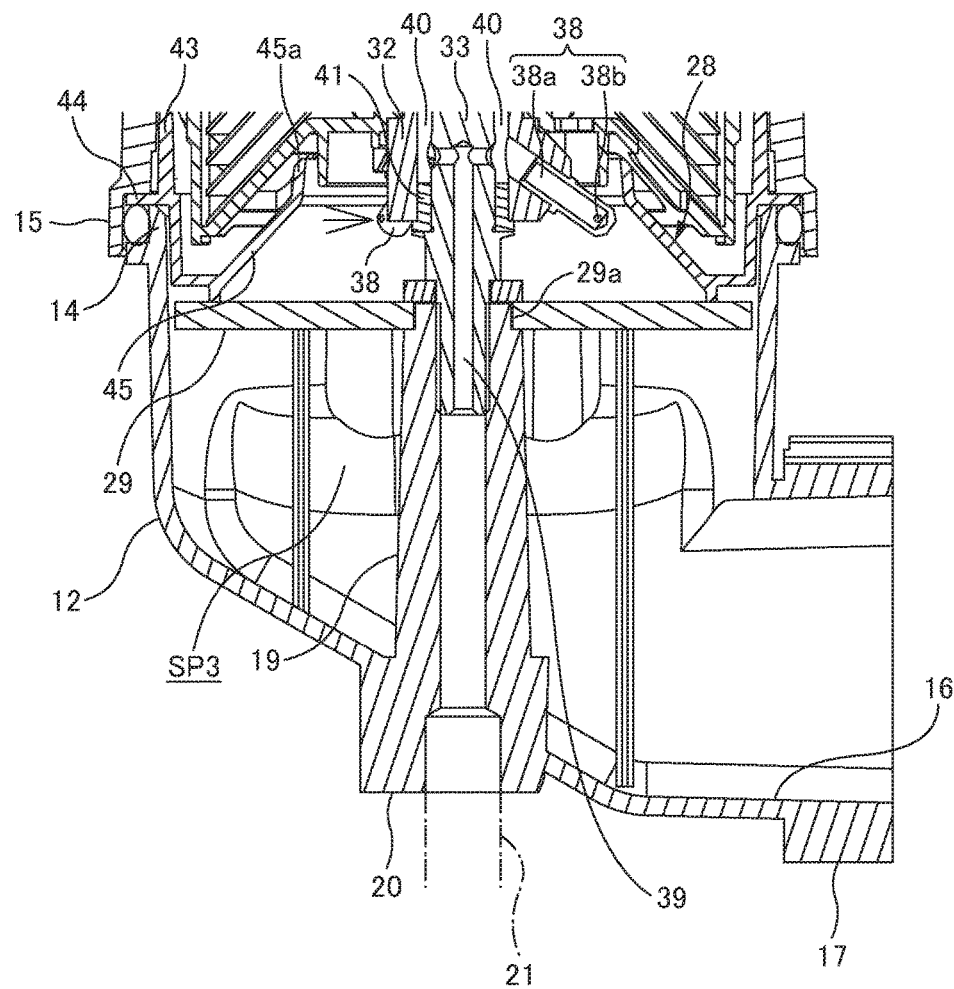
FIG. 5 is a vertical section view of a lower side part of the oil separator viewed from the right side.

The following describes the internal structure of the lower case 12 with reference to FIG. 5. In also FIG. 5, the left side corresponds to the front side of the oil separator 2 and the right side corresponds to the back side of the oil separator 2. As shown in FIG. 5, the communication tube portion 16 is integrally provided on the rear portion of the lower case 12 such that the internal space of the lower case 12 and the internal space of the communication tube portion 16 are in communication. The bottom face of the lower case 12 is inclined downward toward the communication tube portion 16. A cylindrical oil guide pipe 19 is disposed upward from the bottom face of the lower case 12. The joint portion 20 is provided to the lower end of the oil guide pipe 19 and the upper end of the oil guide pipe 19 is fixed with a fixing frame 29. The fixing frame 29 is a frame body mounted to the inner circumferential side of the fitting portion 14 and includes a frame portion shaped to come along the inner circumferential face of the fitting portion 14 and a crossed portion that is in a "+" shape, which is provided to the inner side of the frame portion. The upper end of the oil guide pipe 19 is inserted into the through hole 29a made to the crossing of the crossed portion.

Although not illustrated in FIG. 5, the suction pipe 18 is provided, at a height that comes directly under the fitting portion 14, on the left side face of the lower case 12. The internal space of the lower case 12 and the internal space of the suction pipe 18 are made to communicate with each other. Hereby, the blow-by gas is suctioned from the engine 4 into the internal space of the lower case 12. Further, the power oil injected from the nozzles 38 is injected to the inner wall face of the tapered portion 45 of the partitioning member 28. This power oil flows down along the inner wall face of the tapered portion 45 and the inner wall face of the lower case 12. Here, the power oil flowing down contacts the blow-by gas suctioned into the internal space of the lower case 12. A part of the oil mist contained in the blow-by gas is taken into the power oil by the power oil coming into contact with the blow-by gas. As a result, the amount of oil mist contained in the blow-by gas is reduced.

In this way, the internal space of the lower case 12 corresponds to the primary separation chamber (third space SP3) that primarily separates oil mist from the blow-by gas by having the power oil injected from the nozzles 38 flow downward and simultaneously having blow-by gas introduced therein from the engine 4 such that the blow-by gas and the power oil come into contact.

Further, since the temperature of the power oil injected from the nozzles 38 becomes high at 80 to 110° C., the power oil heats the oil separator 2 from the lower case 12 side. Hereby, performance failures of the oil separator 2 caused by such as freezing can be suppressed even when the oil separator 2 is used in cold regions.

Figure 6:
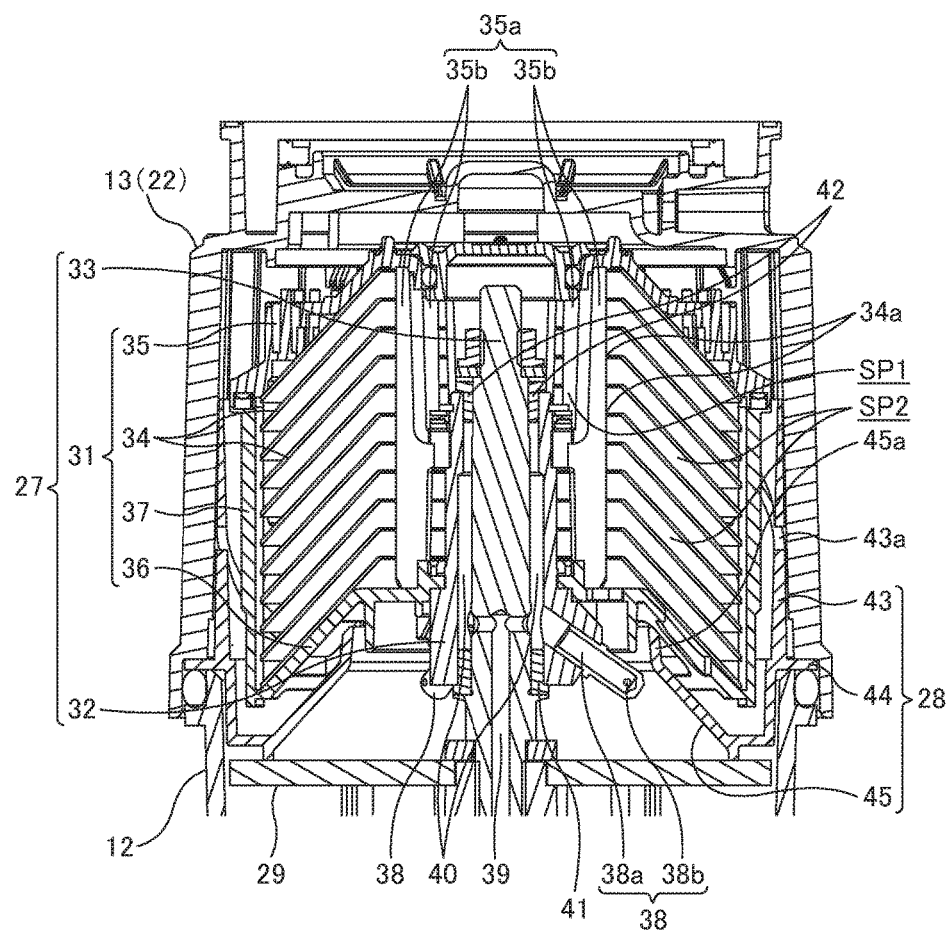
FIG. 6 is a vertical section view of a rotor part of the oil separator viewed from the front side.
Figure 7:
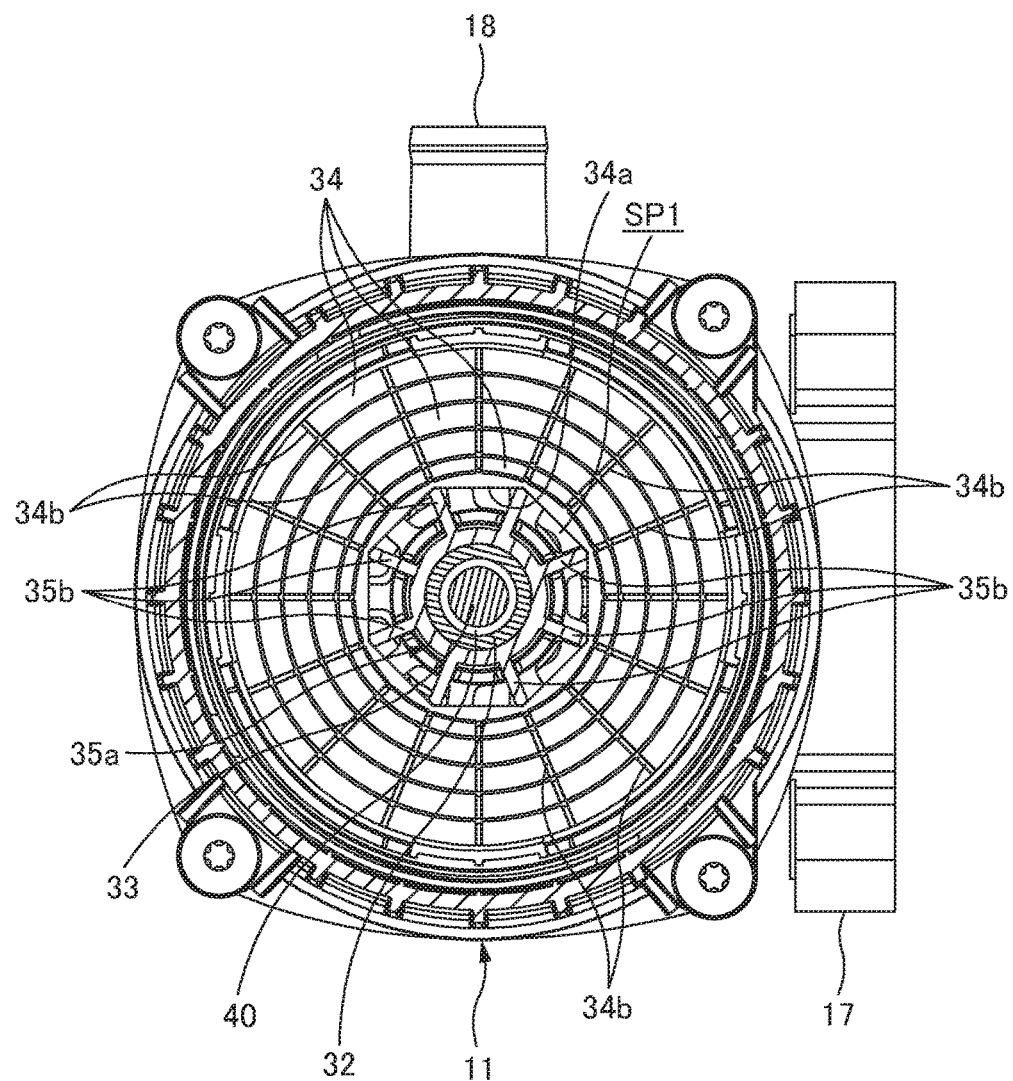
FIG. 7 is a horizontal section view of the middle part of the oil separator cut along line VII-VII in FIG. 4.

Next, with reference to FIGS. 6 and 7, the following gives descriptions of the rotor unit 27. This rotor unit 27 is a mechanism to separate the oil mist contained in the blow-by gas and the rotor unit 27 includes a rotor 31, a spindle 32, and a spindle shaft 33.

The rotor 31 is a part that separates the oil mist from the blow-by gas as illustrated in FIG. 6. The rotor 31 includes a plurality of separation disks 34, an upper holder 35, and a lower holder 36. The separation disks 34 are circular or polygonal plate members in plan view that have the outer peripheral side parts inclined downward toward the outer peripheral side. In other words, the separation disks 34 are plate materials fabricated in a truncated cone shape or a truncated pyramid shape.

Each separation disk 34 of this embodiment has a diameter of 80 to 120 mm and a thickness of 0.3 to 0.4 mm, and is manufactured in a circular shape in plan view by molding resin. These separation disks 34 are layered in the axial direction of the spindle 32 to constitute a separation disk group. For the convenience of explanation, the separation disks 34 are illustrated with intervals provided between each other; however, the actual intervals are defined to be extremely narrow, for example, at 1 mm or less.

The central side parts of the separation disks 34, which correspond to the upper base parts of the truncated cones respectively is provided with an attachment opening 34a. As illustrated in FIG. 7, the attachment opening 34a in the present embodiment is an octagonal hollow portion in plan view in which the disk retaining portion 35a provided to the upper holder 35 is inserted. When the disk retaining portion 35a is inserted in the plurality of separation disks 34, a hollow part (first space SP1) is formed to the rotor 31 with this attachment opening 34a. Further, 16 ribs 34b for securing gaps (second spaces SP2) between the layered separation disks 34 are radially formed to the surfaces on the outer peripheral side parts of the separation disks 34 in an equiangular manner. These ribs 34 allow the gaps between the separation disks 34 to be certainly secured and hereby these gaps and the hollow part of the rotor 31 communicate with each other.

As illustrated in FIG. 6, the upper holder 35 is a member that holds the plurality of layered separation disks 34 from above. Similarly, the lower holder 36 is a member that holds the separation disks 34 from below. A disk retaining portion 35a is provided at the rotation center of the upper holder 35 in a downward facing manner. This disk retaining portion 35a is configured with eight plate members 35b which are radially formed to extend from the rotation center of the rotor 31. The side edges of the respective plate members 35b come into contact with the respective tips of the attachment openings 34a provided to the separation disks 34. In the outer peripheral edge of the lower holder 36, a plurality of coupling arms 37 for coupling to the upper holder 35 are disposed. In this embodiment, the four coupling arms 37 are provided circumferentially at intervals of 90 degrees. The upper ends of the coupling arms 37 are joined to the upper holder 35, and thereby the plurality of separation disks 34, the upper holder 35, and the lower holder 36 are integrated.

This rotor 31 has a cylindrical appearance. On the inner circumferential side that is the rotation center of the rotor 31, there is a hollow part, and the hollow part vertically extends through. The spindle 32 is inserted into this hollow part and the spindle 32 and the rotor 31 are joined to one another. The spindle 32 and the rotor 31 according to the present embodiment are coupled by the eight plate members 35b that constitute the disk retaining portion 35a being joined to the circumferential face of the spindle 32. The disk retaining portion 35a is inserted into the respective attachment openings 34a of the separation disks 34. Thus, the rotor 31 rotates, together with the spindle 32, about the axis of the spindle 32.

The nozzles 38 project from the peripheral surface parts of the spindle 32, the parts being located below with respect to the rotor 31. Each of the nozzles 38 is a part from which the oil supplied through the spindle shaft 33 is injected to generate a driving power to rotate the spindle 32 and the rotor 31. The nozzles 38 of this embodiment include cylindrical nozzle bodies 38a and injection holes 38b disposed at distal end portions of the nozzle bodies 38a. Base ends of the nozzles 38 are coupled to the spindle 32, and the distal ends of the nozzle bodies 38a are closed. The nozzle bodies 38a are mounted at an angle of 45 degrees obliquely downward with respect to the axial direction of the spindle 32. The three nozzle bodies 38a are circumferentially disposed at intervals of 120 degrees. The injection hole 38b is disposed on a side surface at the distal end portion of the nozzle body 38a. More specifically, the injection hole 38b is disposed in a direction perpendicular to the axial direction of the nozzle body 38a, the direction being a direction in which oil is injected horizontally.

The spindle shaft 33 is a pillar member serving as a bearing of the spindle 32, and supports the spindle 32 in a rotatable manner. The spindle shaft 33 internally includes a first oil supply passage 39 to supply the oil. A lower end portion of the spindle shaft 33 is joined to an upper end of the oil guide pipe 19. As described above, the oil supply pipe 21 is coupled to the joint 20 of the oil guide pipe 19. Accordingly, the oil supplied through the oil supply pipe 21 passes through the oil guide pipe 19, and then flows into the first oil supply passage 39 as power oil.

A gap that has its top and bottom closed is formed between the spindle 32 and the spindle shaft 33. This gap serves as a second oil supply passage 40. The second oil supply passage 40 is in communication with the first oil supply passage 39 and the nozzles 38, and is filled with oil supplied from the first oil supply passage 39. A part of the oil supplied to the second oil supply passage 40 flows into the nozzle bodies 38a and thereafter injected from the injection holes 38b.

The lower end of the second oil supply passage 40 is sealed with a cylindrical lower side sealing member 41. Similarly, the upper end of the second oil supply passage 40 is sealed with a cylindrical upper side sealing member 42. A small amount of oil leaks out from the gaps created between the lower side sealing member 41 and the spindle, and the upper side sealing member 42 and the spindle 32 along with rising of the oil pressure. When the rotor 31 of this embodiment is rotated at a speed that creates a centrifugal force of substantially 200 G, oil of about 50 to 200 mL/min is introduced through the gap created between the upper end of the spindle 32 and the upper side sealing member 42 and into the inner circumferential side space (first space SP1) of the rotor 31. For the purpose of convenience, the oil introduced from the upper end of the second oil supply passage 40 and into the inner circumferential space of the rotor 31 is also called cleansing oil in the following description.

The cleansing oil that has been introduced into the inner circumferential space of the rotor 31 flows down this space and along the outer surface of the spindle 32 and spreads along the surfaces of the plate members 35b of the disk retaining portion 35a toward the outer peripheral side. The cleansing oil that had spread to the outer peripheral side flows from the edges of the attachment openings 34a and into the gaps (second space SP2) formed between the separation disks 34. Then the cleansing oil that had flown into the gaps spreads along the surface to the outer peripheral side of the separation disks 34 to be discharged outward from the outer peripheral edges of the separation disks 34.

In this way, the upper end of the second oil supply passage 40, specifically the gap between the upper end of the spindle 32 and the upper side sealing member 42 serves as the oil introducing portion that introduces a part of the oil supplied to the second oil supply passage 40 as the cleansing oil. This cleansing oil is also at a high temperature between 80 to 110° C. so that the oil heats the rotor 31 and its proximate areas from the inside. Hereby, performance failures of the oil separator 2 caused by such as freezing can be suppressed even when the oil separator is used in cold climate areas.

The following describes the partitioning member 28. The partitioning member 28 is disposed between the rotor 31 and the nozzles 38. The partitioning member 28 is a member that partitions the internal space of the housing 11 into an internal space of the lower case 12 (primary separation chamber, third space SP3) and an internal space of the upper case 13 and at the same time forms the flow passage that guides the blow-by gas of the lower case 12 to the hollow part (first space SP1) of the rotor 31.

This partitioning member 28 has an outer peripheral portion 43, a brim portion 44 and a tapered portion 45. The outer peripheral portion 43 is a cylindrical part and is formed to surround the rotor 31. This outer peripheral portion 43 has an elongated slot 43a formed inclined with respect to the vertical direction. Cleansing oil that is discharged outward from the outer peripheral edges of the separation disks 34 hits against the inner wall face of the outer peripheral portion 43. The cleansing oil that had hit the inner wall face spreads along this inner wall face and flows downward while circulating. During such, a part of the oil is discharged through the slots 43a to the outer peripheral side space. This makes it difficult for oil to accumulate in the gap created between the outer peripheral portion 43 and the rotor 31 and thus can suppress problems of oil being taken away by the flow of the blow-by gas. As a result, the performance of oil mist separation from the blow-by gas can be improved.

The brim portion 44 that is located in the middle in the height direction of the outer peripheral portion 43 projects to the side. As mentioned above, this brim portion 44 is a part that positions the partitioning member 28 and is sandwiched between the lower end portion 15 of the upper case 13 and the fitting portion 14 of the lower case 12. The tapered portion 45 is disposed on the inner circumferential side with respect to the outer peripheral portion 43, and has a tapered shape in which the diameter is gradually reduced from the lower end of the outer peripheral portion 43 toward the top. An upper end opening 45a of the tapered portion 45 is disposed proximate from below the surface center of the lower end of the rotor 31.

The lower end portion of the spindle 32, the lower end portion of the spindle shaft 33, the nozzles 38 and the fixing frame 29 are disposed on the inner circumferential side of the tapered portion 45 and below the upper end opening 45a. As mentioned above, the power oil that has been injected from the nozzles 38 hits against the inner wall face of the tapered portion 45 to flow down along this inner wall face and thereafter flows down into the internal space of the lower case 12. When the power oil flows down, the power oil comes into contact with the blow-by gas and the oil mist contained in the blow-by gas is primarily separated. The blow-by gas having the oil mist primarily separated, rises up the inner circumferential side of the tapered portion 45 to be guided to the hollow portion (first space SP1) of the rotor.

Figure 8:
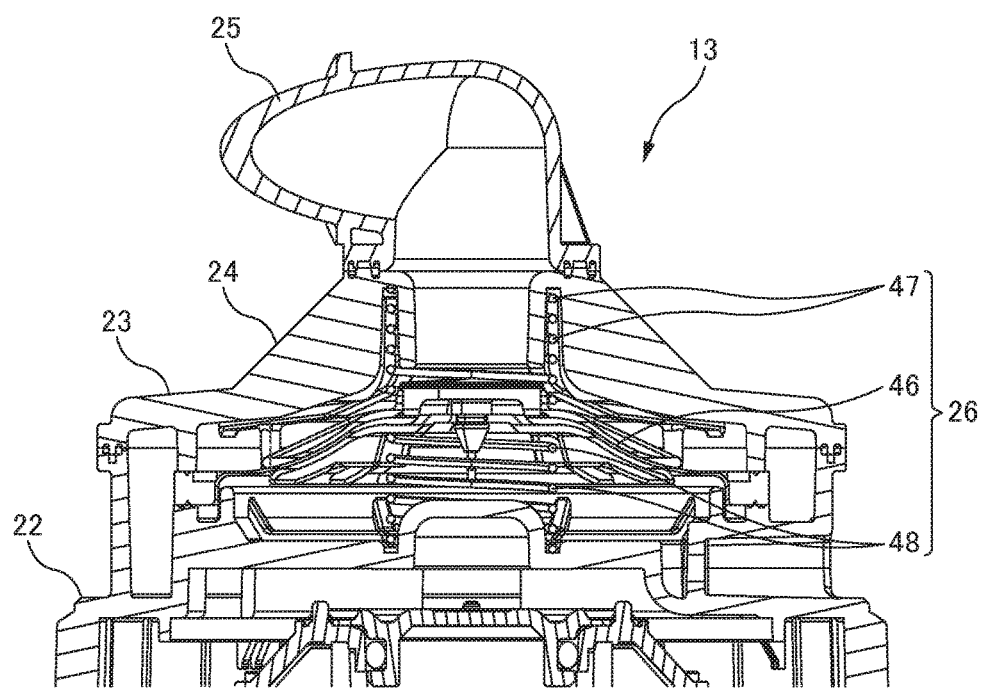
FIG. 8 is a vertical section view illustrating in an enlarged manner parts proximate the PCV valve.

The following describes the PCV valve 26. As illustrated in FIG. 8, the PCV valve 26 includes a diaphragm 46, upper springs 47, and lower springs 48.

The diaphragm 46 is a disc-shaped valve element and is manufactured by molding rubber and resin. The upper springs 47 and the lower springs 48 are elastic members to support the diaphragm 46 in a manner such that the diaphragm 46 can move vertically. That is, the upper springs 47 are disposed above the diaphragm 46 and the lower springs 48 are disposed below the diaphragm 46. The diaphragm 46 is movably supported by being sandwiched between these upper springs 47 and lower springs 48.

The diaphragm 46 vertically moves according to the intake-side pressure of the engine 4 and the internal pressure of the crankcase, to adjust the flow of the blow-by gas. That is, under an excessively large intake pressure (negative pressure) of the engine 4, the diaphragm 46 moves toward the blow-by gas discharge side (upward), and under a high pressure of the side close to the crankcase, the diaphragm 46 moves toward the opposite side (downward). Hereby, the flow rate of the blow-by gas is appropriately adjusted. Further, the engine 4 (crank case) pressure is also appropriately adjusted.

Next, the separation of the oil mist with the oil separator 2 of this embodiment will be described. This oil separator 2 is characterized to separate the oil mist in particularly the rotor 31. Therefore, description will be given mainly on the separation of the oil mist in the rotor 31.

Figure 9:
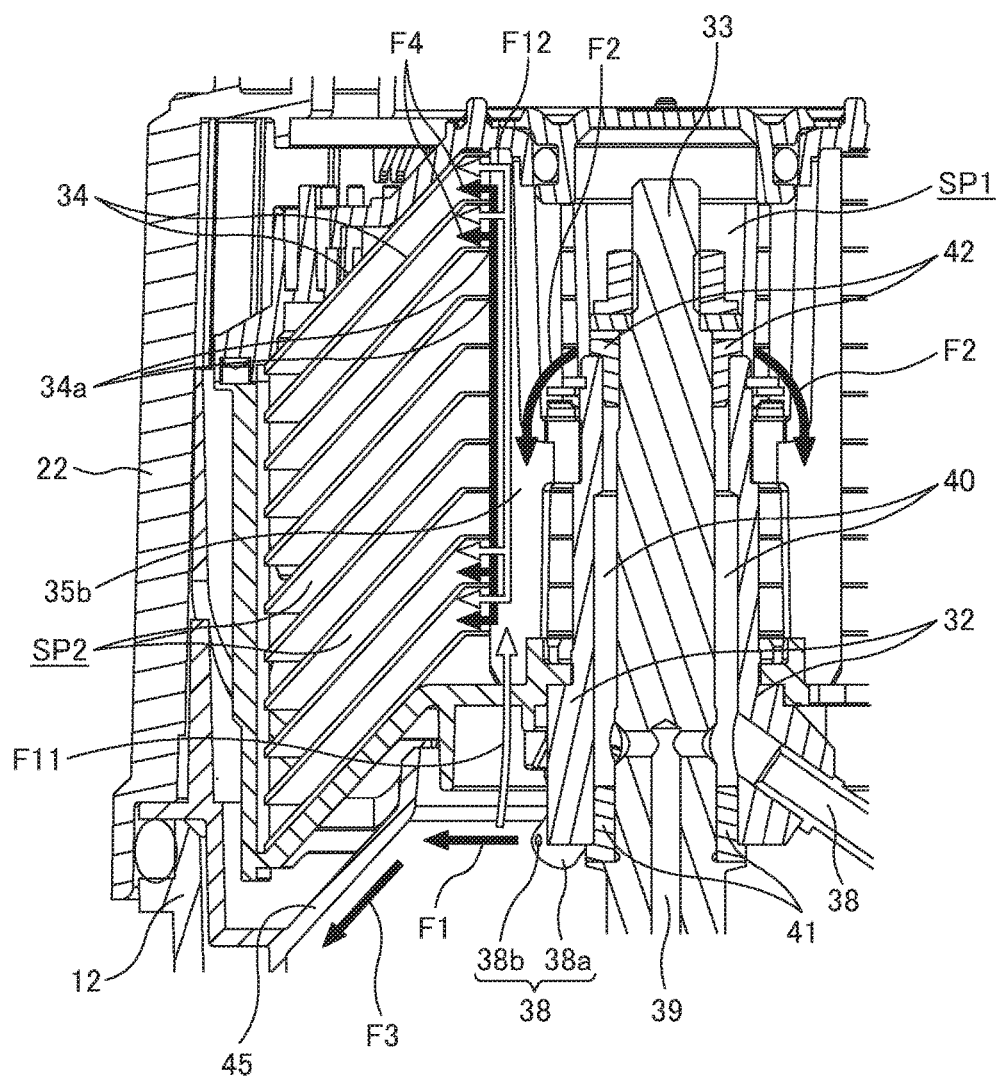
FIG. 9 is a partially enlarged cross-sectional view illustrating an inner circumferential side space formed on the inner circumferential side of the rotor and separation spaces formed between the separation disks.

This oil separator 2 rotates the rotor 31 using the oil (a part of lubricant) supplied from the engine 4 for power. In other words, the oil supplied through the oil supply pipe 21 after flowing through the oil guide pipe 19 flows into the first oil supply passage 39 of the spindle shaft 33. Thereafter, a part of the oil after flowing through the second oil supply passage 40 is injected out from the nozzles 38 as the power oil, as indicated with the arrow with the reference sign F1 in FIG. 9. Further, another part of the oil supplied from the engine 4 after flowing through the second oil supply passage 40 as cleansing oil is introduced from the upper end (oil introducing portion) of the second supply passage 40 into the space on the inner circumferential side in the rotor 31, as indicated with the arrows with the reference sign F2.

In this way, the oil separator 2 injects oil, which had been supplied from the engine 4, from the nozzles 38 and introduces oil into the hollow part of the rotor 31 from the upper end of the second oil supply passage 40. As mentioned above, the temperature of the oil rises to 80 to 110° C. by the operation of the engine 4 to also raise the temperature of the oil separator 2 so that the moisture in the rotor 31 can be kept from freezing.

The blow-by gas from the engine 4 is introduced into the internal space of the lower case 12 with the suction of air by the engine 4. Meanwhile, the power oil injected from the nozzles 38 are sprayed against the inner wall face of the partitioning member 28 and thereafter flows down along the inner wall face of the partitioning member 28 and the inner wall face of the lower case 12, as mentioned above, as indicated with the arrow with the reference sign F3. Hereby, the blow-by gas contacts the power oil and a part of the oil mist contained in the blow-by gas is taken into the power oil. In other words, a primary separation of the oil mist takes place.

The blow-by gas having the oil mist primarily separated, rises up the inner circumferential space of the tapered portion 45 with the suction of air by the engine 4 and thereafter guided to the center portion along in the plane direction at the lower end of the rotor 31 as indicated with the arrow with the reference sign F11. Then the blow-by gas is made to flow into the hollow part (first space SP1) of the rotor 31. Since the rotor 31 rotates at high speed in this hollow part, the cleansing oil introduced therein spreads along the surface of the plate members 35b that constitute the disk retaining portion 35a and flows from the edge portions of the attachment openings 34a and into the gaps (second spaces SP2) between the separation disks 34, as indicated with the arrows with the reference signs F4. The blow-by gas is also made to flow from the edge portions of the attachment openings 34a and into the gaps (second spaces SP2) between the separation disks 34, as indicated with the arrows with the reference signs F12.

Figure 10:
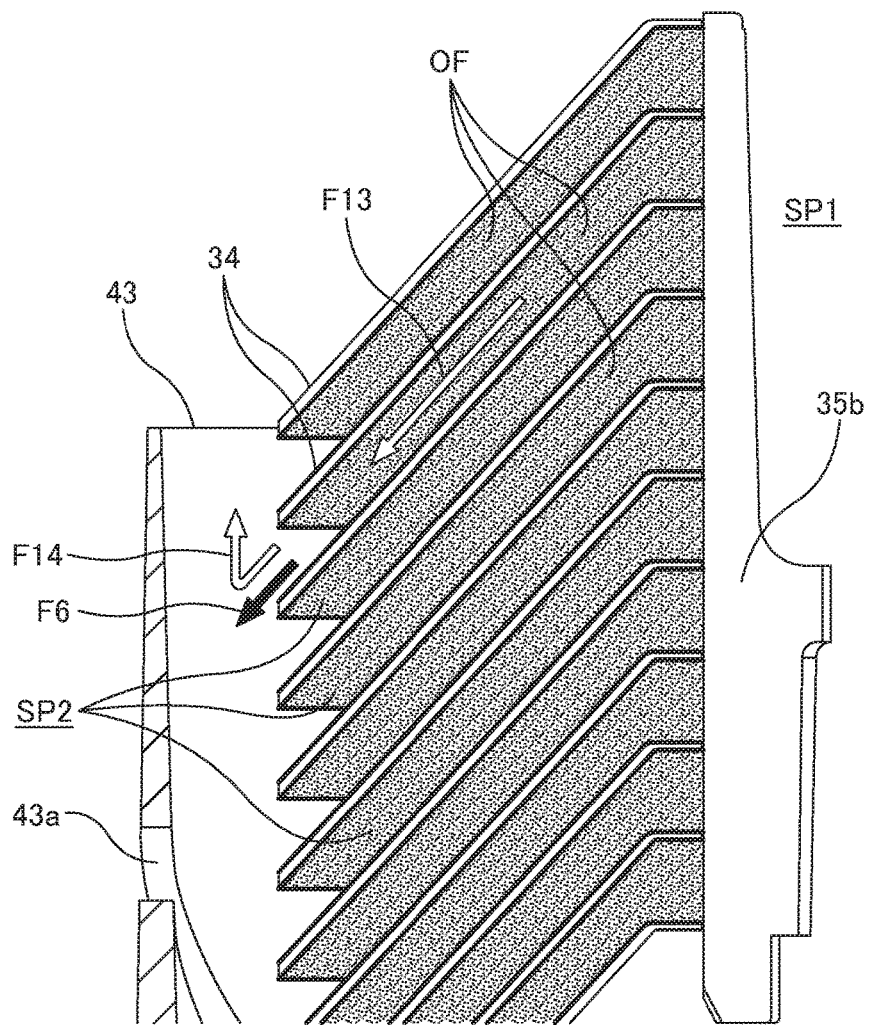
FIG. 10 is a diagram illustrating oil film formed to the separation disk surface and flows of blow-by gas.
Figure 11:
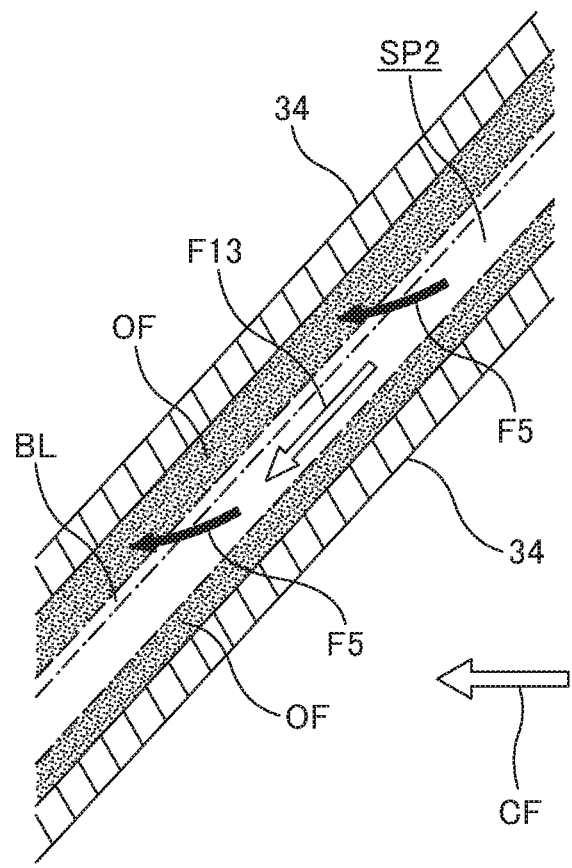

As illustrated in FIG. 10, the cleansing oil that had flown into the gaps between the separation disks 34 spreads evenly along the surfaces of the separation disks 34 since the rotor 31 rotates at high speed. As indicated with the arrow with the reference sign F13, the blow-by gas flows while contacting the oil films OFs formed on the surfaces of the separation disks 34. And as shown enlarged in FIG. 11, a boundary layer BL is formed on the surface of the oil film OF. Then, when the blow-by gas flows along the surface side of the boundary layer BL toward the outer peripheral edge of the separation disk 34, as indicated with the arrow with the reference sign F13, the oil mist contained in the blow-by gas is taken into the boundary layer BL as indicated with the arrow with the reference sign F5. The oil mist taken into the boundary layer BL is made to move by the centrifugal force indicated with the reference sign CF and merges with the oil film OF.

Here, since the oil mist originates from the lubricant similar to the oil film OF (cleansing oil), the oil mist has a higher compatibility characteristic (wettability) with the oil film OF compared to the separation disks 34. Hereby, the boundary layers BL formed on the surface of the oil films OF can more effectively take in the oil mist with respect to the boundary layers BL formed on the surfaces of the separation disks 34. As a result, high separation efficiency can be achieved even when the separation disks 34 are configured with small diameters and therefore allowing to downsize the oil separator 2.

Further, this oil separator 2 can separate oil mist as well as vaporize the water contained in the lubricant. In other words, since the temperature of the cleansing oil is high between 80 to 110° C., the oil films OFs formed on the surfaces of the separation disks 34 also has the temperature of the oil films OFs in a range that is sufficient to vaporize the moisture. Furthermore, since the oil films OFs are densely formed due to the multiply layered separation disks 34, the temperature of the oil films OFs can be maintained. Even furthermore, the oil films OFs being formed on the entire surfaces of the separation disks 34, secures a sufficient area for efficiently vaporizing moisture. For these reasons, water contained in the lubricant can be efficiently vaporized. Hereby, problems of emulsion being formulated to the lubricant can be suppressed.

The cleansing oil that had taken in the oil mist, as indicated with the arrow with the reference sign F6 in FIG. 10, is discharged outward from the outer peripheral edges of the separation disks 34. The discharged cleansing oil hits against the outer peripheral portion 43 of the partitioning member 28 and flows down while circulating along the inner wall face of this outer peripheral portion 43. Hereby, an oil film is also formed to the inner wall face of the outer peripheral portion 43. The oil mist contained in the blow-by gas is captured and the captured oil mist is kept from being re-dispersed as well by the discharged cleansing oil being taken into the oil film.

When the cleansing oil reaches the lower end of the outer peripheral portion 43, the oil flows through the drain hole (not shown) formed to the bottom portion of the partitioning member 28 to be discharged to the internal space (third space SP3) of the lower case 12. As mentioned above, since power oil flows into the internal space of the lower case 12, the cleansing oil mixes with the power oil. Then the power oil and the cleansing oil merges with the oil mist taken in and flow through the communication tube portion 16 to be returned to the engine 4.

Meanwhile, the processed blow-by gas having oil mist separated being discharged outside from the outer peripheral edges of the separation disks 34, rises up the interior of the housing 11 by the suction of the engine 4, as indicated with the arrow with reference sign F14. Here, the moisture vaporized from the oil film OF does not condensate and moves together with the blow-by gas since the inner portion of the oil separator is heated with the cleansing oil and the power oil. Then the processed blow-by gas passes through the PCV valve 26, the gas discharge portion 24 and the gas discharge portion 25 together with the moisture vaporized from the oil film OF to be discharged from the oil separator 2. Thereafter, the processed blow-by gas is returned to the intake-side flow passage 6 through the breather pipe 3.

According to the oil separator 2 of the present embodiment, oil films OFs are formed on the surfaces of the separation disks 34 with the cleansing oil in this way so that oil mist can be effectively separated from the blow-by gas.

Additionally, the oil supplied to the first oil supply passage 39 and the second oil supply passage 40 is used as the power for rotating the spindle 32 as well as used to form the oil films OFs thereby simplifying the device configurations.

Further, since the oil mist originates from the lubricant of the engine 4 and the oil films OFs are the lubricant of the engine 4, compatibility thereof are increased to allow the oil mist to be taken into the oil films OFs in a further efficient manner.

Further after primarily separating the oil mist by allowing the blow-by gas to contact the power oil in the internal space of the lower case 12, the processed blow-by gas is made to contact the cleansing oil at the interior (gaps between the separation disks 34) of the rotor 31 for secondary separation of the oil mist and hereby the oil mist can be separated at a high level.

The description of the above-described embodiment is for ease of understanding of the present invention and does not limit the present invention. The present invention may be modified or improved without departing from the gist and includes the equivalents. For example, the present invention may be configured as follows.

The hollow part of the rotor 31 in the present embodiment is formed with octagonal attachment openings 34a, in plan view, however, there is no limitation to such configuration as long as it is a space in which blow-by gas can be introduced.

The separation disks 34 are not limited to a truncated cone shape and may be a truncated pyramid shape. Note that, when the separation disks 34 are in a truncated pyramid shape, it is preferable that it is at least a quadrangular pyramid shape and more preferably at least an octagonal pyramid shape.

The lower case 12, the communication tube portion 16, the suction pipe 18 and the oil guide pipe 19 of the present embodiment are manufactured of cast metal, however, they may be manufactured by molding resin.

The cleansing oil supply passage in the aforementioned embodiment was partly used in common with the power oil, however, there is no limitation to such configuration. The cleansing oil may be supplied through a passage of a system separate from the power oil. In such case, the rotation of the rotor 31 may be performed by a motor. In other words, the spindle 32 should be rotated with the motor.

The target gas is not limited to blow-by gas. The present invention can be applied as long as the device separates oil mist from target gas containing oil mist.

When introducing target gas in the aforementioned embodiment, oil mist introduced the target gas primarily separated at the lower case 12 into the hollow part of the rotor 31, however, there is no limitation to such configuration. The target gas may be directly introduced into the hollow part of the rotor 31.

An outer peripheral portion 43 of the partitioning member 28 was exemplified to have elongated slots 43a provided thereto, however, the elongated slots 43a are to be provided according to need.

REFERENCE SIGNS LIST

1 closed crankcase ventilation system, 2 oil separator
3 breather pipe, 4 engine, 5 gas guide pipe
6 intake-side flow passage, 7 air filter, 8 turbocharger
9 charge cooler, 11 housing, 12 lower case, 13 upper case
14 fitting portion in lower case
15 lower end portion in upper case
16 communication tube portion, 17 flange, 18 suction pipe
19 oil guide pipe, 20 joint of oil guide pipe
21 oil supply pipe, 22 body cover
23 top surface cover, 24 gas discharge portion
25 outlet pipe, 26 PCV valve, 27 rotor unit
28 partitioning member, 29 fixing frame,
29a penetration holes of fixing frame, 31 rotor
32 spindle, 33 spindle shaft, 34 separation disk
34a attachment opening of separation disk
34b rib of separation disk, 35 upper holder
35a disk retaining portion
35b plate member of disk retaining portion
36 lower holder, 37 coupling arm
38 nozzle, 38a nozzle body, 38b injection hole
39 first oil supply passage
40 second oil supply passage
41 lower sealing member, 42 upper sealing member
43 outer peripheral portion of partitioning member 43a slit, 44 brim portion of partition member
45 tapered portion of partition member
45a upper end opening of tapered portion
46 collar portion of partition member
47 upper spring of PCV valve
48 lower spring of PCV valve
SP1-SP3 first to third spaces, OF oil film,
BL boundary layer, F1 to F6 flows of oil
F11 to F14 flows of blow-by gas

The invention claimed is:

1. An oil mist separation method that separates oil mist from target gas by using an oil separator including a rotor that is rotatable together with a spindle and by rotating the rotor, the method comprising:
    including in the rotor a separation disk group, the separation disk group having separation disks made with a plurality of truncated cone shape plate members layered in an axis direction of the spindle;
    including in the separation disk group a first space and a second space, the first space being formed on a rotation center side of the rotor and the second space being formed between the separation disks that are laid over and being in communication with the first space;
    disposing in the first space an oil introducing portion that introduces oil;
    introducing the oil from the oil introducing portion together with the target gas into the first space, while the rotor is in a rotating state; and
    allowing the target gas to flow from the first space into the second space together with the oil introduced from the oil introducing portion and to be discharged outward from an outer peripheral edge of the separation disk group.

2. The oil mist separation method according to claim 1, wherein
    the oil separator includes a nozzle that is provided to protrude from a circumferential face of the spindle on a lower side with respect to the separation disks and that rotates the spindle by injecting oil, and a spindle shaft that rotatably supports the spindle and that has internally formed an oil supply passage to supply the oil,
    the oil introducing portion is configured with a gap between the spindle and the spindle shaft, and
    a part of the oil supplied to the oil supply passage is injected from the nozzles and another part of the oil is introduced from the oil introducing portion into the first space.

3. The oil mist separation method according to claim 2, wherein
    the target gas is blow-by gas that is supplied from the engine and
    oil supplied to the oil supply passage is a lubricant of the engine.

4. The oil mist separation method according to claim 2, wherein
    the oil separator includes a third space in which oil injected from the nozzles flows down and in which the target gas is introduced, and a partitioning member that is disposed at a boundary between the third space and the first space,
    the target gas is made to contact the oil injected from the nozzles and the oil mist is primarily separated from the target gas in the third space,
    the target gas that had the oil mist primarily separated is introduced into the first space by the partitioning member,
    the target gas is made to flow from the first space into the second space together with the oil introduced from the oil introducing portion, and
    the target gas is made to contact the oil introduced from the oil introducing portion and the oil mist is secondarily separated from the target gas in the second space.

5. An oil separator including a rotor that is rotatable together with a spindle and being configured to separate oil mist from target gas by rotating the rotor, comprising:
    a separation disk group that is included in the rotor and that has separation disks made with a plurality of truncated cone shape plate members layered in an axis direction of the spindle;
    a first space and a second space that are included in the separation disk group, the first space being formed on a rotation center side of the rotor and having the target gas flow in, and the second space being formed between the separation disks that are laid over and being in communication with the first space; and
    an oil introducing portion that is disposed in the first space, the oil introducing portion being configured to introduce oil.

6. The oil mist separation method according to claim 3, wherein
    the oil separator includes a third space in which oil injected from the nozzles flows down and in which the target gas is introduced, and a partitioning member that is disposed at a boundary between the third space and the first space,
    the target gas is made to contact the oil injected from the nozzles and the oil mist is primarily separated from the target gas in the third space,
    the target gas that had the oil mist primarily separated is introduced into the first space by the partitioning member,
    the target gas is made to flow from the first space into the second space together with the oil introduced from the oil introducing portion, and
    the target gas is made to contact the oil introduced from the oil introducing portion and the oil mist is secondarily separated from the target gas in the second space.

* * * * *